A. F. MASURY

Sept. 22, 1931. DRIVE FOR MOTOR VEHICLES Re. 18,206

Original Filed June 17, 1927 3 Sheets-Sheet 1

INVENTOR:
Alfred F. Masury
BY
Redding, Greeley, O'Shea & Campbell
his ATTORNEYS

A. F. MASURY
Sept. 22, 1931. DRIVE FOR MOTOR VEHICLES Re. 18,206
Original Filed June 17, 1927 3 Sheets-Sheet 2
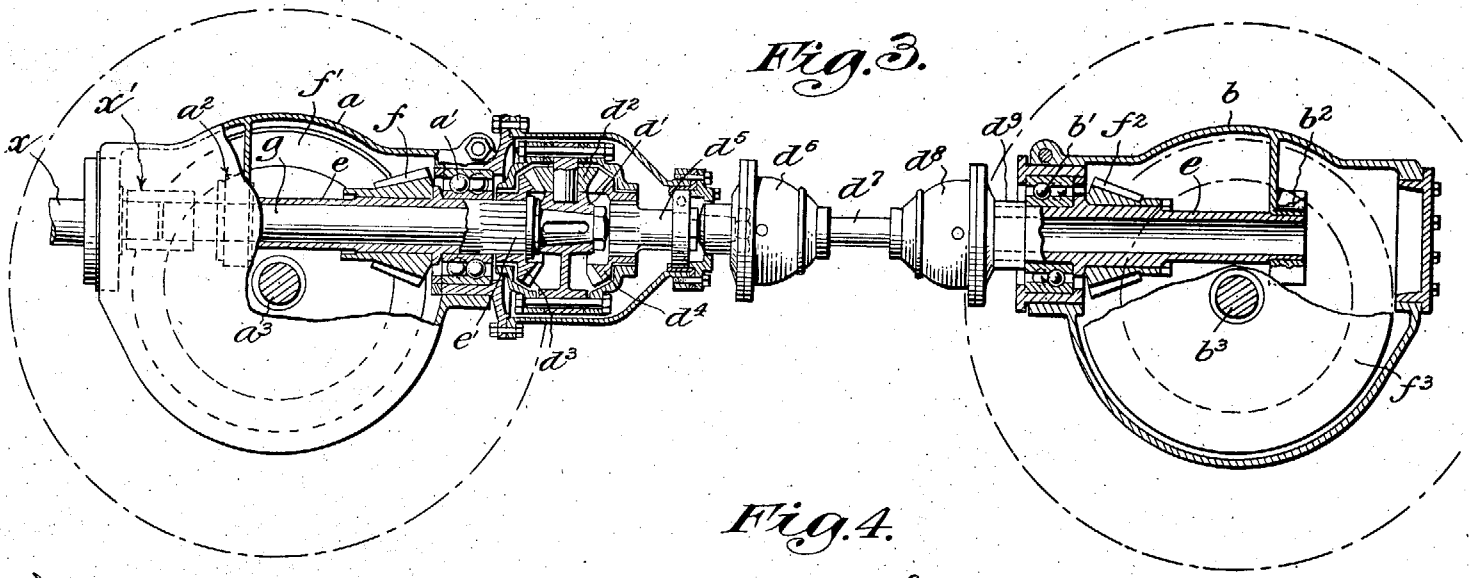
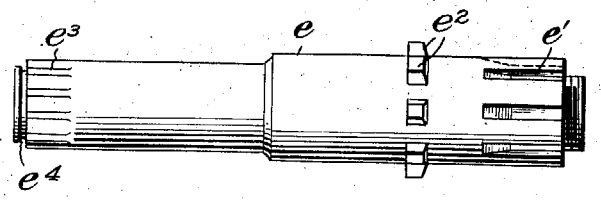
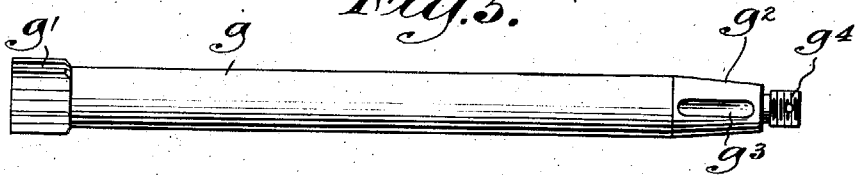
INVENTOR:
Alfred F. Masury
BY
Redding, Greeley & Thurston Campbell
his ATTORNEYS.

A. F. MASURY
Sept. 22, 1931. DRIVE FOR MOTOR VEHICLES Re. 18,206
Original Filed June 17, 1927 3 Sheets-Sheet 3
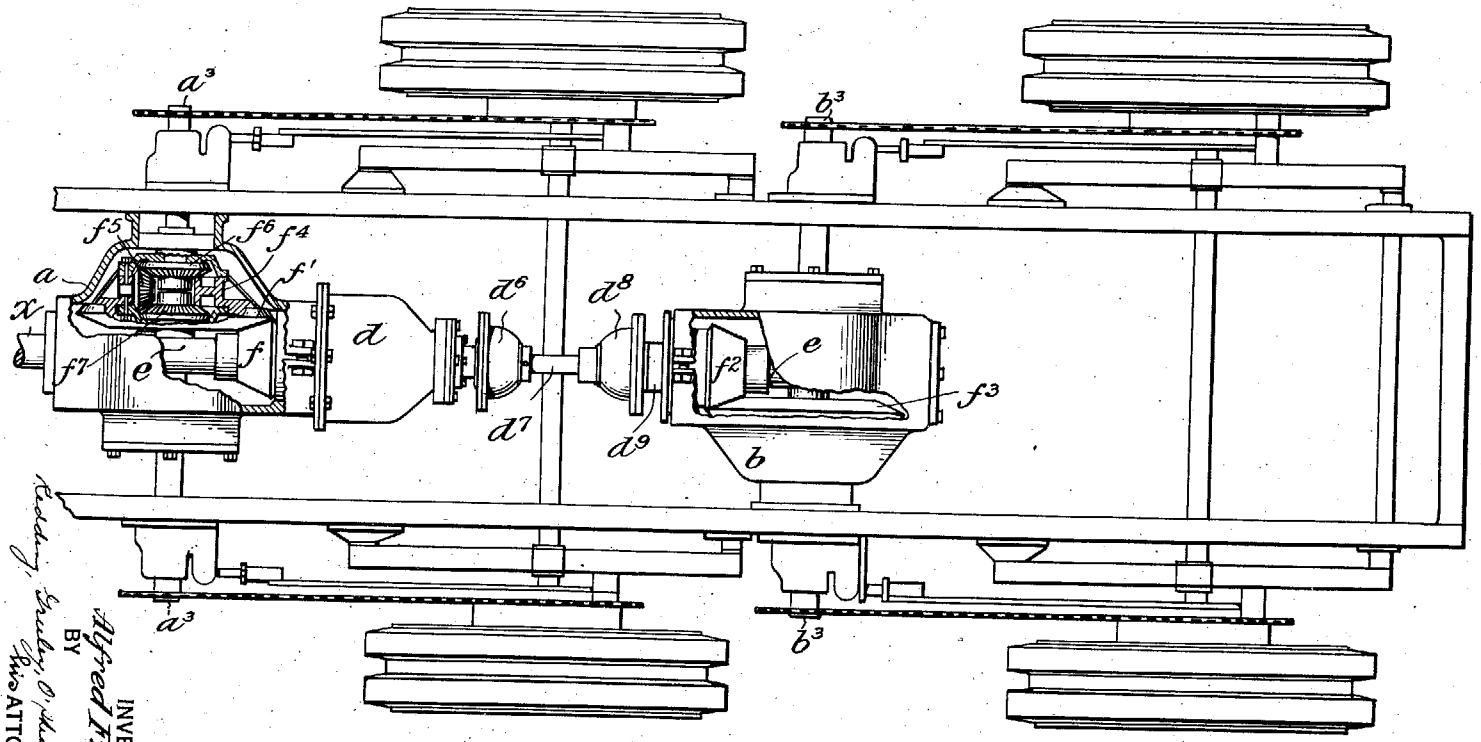
INVENTOR:
Alfred F. Masury
BY
Redding, Gruley, O'Shea & Campbell
his ATTORNEYS.

Reissued Sept. 22, 1931

Re. 18,206

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

DRIVE FOR MOTOR VEHICLES

Original No. 1,791,138, dated February 3, 1931, Serial No. 199,429, filed June 17, 1927. Application for reissue filed July 23, 1931. Serial No. 553,676.

One of the disadvantages incident heretofore in the production of six wheeled motor vehicles having dual rear axle drives was the necessity of designing anew the parts for the axle drives. The standard parts manufactured for use with the ordinary single rear axle drives could not be used. The production of parts for the dual rear axles, therefore, required the expenditure of considerable time and money for additional dies, tools, fixtures, etc.

It is, then, the principal object of this invention to so design the parts for a rear axle that they may be used interchangeably in either single or dual rear axle drives. Accordingly, it is proposed to form the shaft, upon which is mounted the pinion driving the differential ring gear, as a hollow tubular member in which may be journaled another solid shaft for a purpose and in a manner which will be more apparent hereinafter.

It is a further object of the invention to provide means whereby the differential between the two pairs of driving axles may be mounted at the rear of the forward of the pair instead of being mounted in front thereof, as has heretofore generally been the practice.

When used in a single rear axle drive the hollow shaft above referred to is journaled freely in bearings at two points in the axle housing. The solid shaft, disposed within the hollow member, is connected at one end to the transmission shafting of the vehicle and at its other end to the hollow shaft, so that the path of power will be from the transmission shafting through the solid shaft to the hollow shaft and so to the differential ring gear which meshes with a driving pinion mounted upon the hollow shaft.

When used in a dual rear axle a hollow shaft member is journaled freely at two points within the forward of the two rear axle housings and the solid member, journaled therewithin, is connected at one end to the transmission shafting of the vehicle and at its other end to a differential planet pinion carrier, the differential being mounted at the rear of the two axle housings. One element of the differential is then connected to an end of the hollow shaft member while the other is connected to the shafting for the rear of the two pair of axles, a hollow shaft member being used to drive the rearward of the two axles without the use of the solid member. The path of power, then, will be from the transmission shafting through the solid shaft to the differential at the rear of the forward of the two axle housings where it is divided between the hollow shafts from which are driven the differential for each of the pair of driving wheels, one driven element of the first named differential being connected directly to the hollow shaft in the forward driving axle and the other being connected to the shafting for the rearward driving axle.

For a fuller understanding of the nature of the invention reference is to be had to the following detailed description thereof read in connection with the accompanying drawings, in which:

Figure 3 is a view partly in section of a dual rear axle drive showing the invention applied thereto, parts being broken away in the interest of clearness.

Figure 4 is a view in detail of the hollow shaft member.

Figure 5 is a view in detail of the solid shaft member.

Figure 6 is a plan view of a dual rear axle chain drive, parts of the axle housings being broken away to show the interior thereof.

It will be understood, as the description proceeds, that the invention is equally applicable for use in connection with rear axles whether they be sprung or unsprung with respect to the chassis frame of the vehicle. Hence, the invention has been illustrated in different views both as applied to situations in which the driving axles are sprung with respect to the chassis frame and in which the driving axles are unsprung with respect to the chassis frame, such as, for instance, chain drives. It is to be understood that so far as the invention is concerned the relative parts may be used interchangeably, whatever the mode of suspending the driving axles from the chassis frame.

Figure 1:
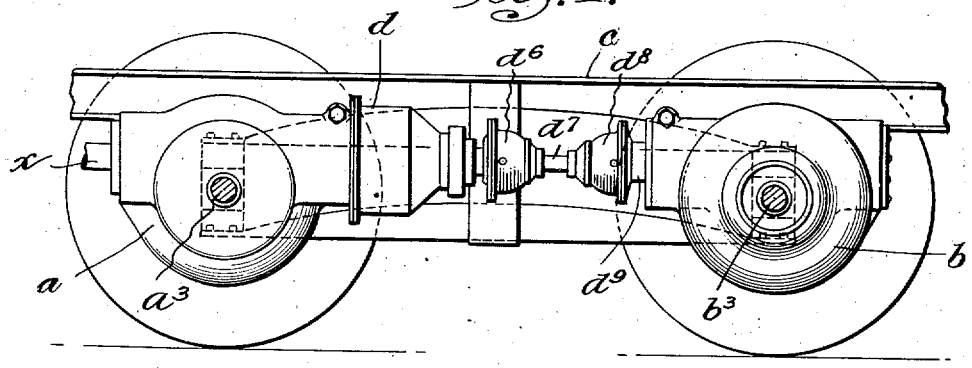
Figure 1 is a view in side elevation of a dual rear axle drive according to the invention.

There has been illustrated in Figure 1 a dual rear axle drive in which the housings $a$, $b$, for the differential and driving axles, are sprung with respect to the chassis frame $c$. At the rear of the forward of the two housings $a$, there is mounted a housing $d$ for the differential between the two driving axles. Within the housing $a$ there is journaled a hollow shaft member $e$ as by means of the bearings $a'$, $a^2$. Mounted upon the hollow shaft $e$ is the hypoid pinion $f$ which meshes with the hypoid ring gear $f'$ of the differential for the wheels driven by the live axle sections $a^3$. The hollow shaft member $e$ has journaled therewithin the solid shaft $g$ which is splined at one end $g'$ for connection with the transmission shafting $x$ as by means of the sleeve $x'$. The other end $g^2$ of the solid shaft $g$ extends through the hollow shaft $e$ and has mounted thereupon the carrier $d'$ for the planet pinions $d^2$ of the differential between the forward and rearward driving axles. Mounted upon the splined end $e'$ of the hollow shaft $e$ is the gear $d^3$ which constitutes one element of the differential, the other gear $d^4$ thereof being carried with the short shaft section $d^5$ which is connected to the universal joint $d^6$. The universal joint $d^6$ is connected through the short shaft section $d^7$ with another universal joint $d^8$ which, in turn, is connected to a splined end $e'$ of another hollow shaft member $e$, as by means of the sleeve $d^9$. The hollow shaft member $e$ for the rearward of the pair of driving axles is journaled within the housing $b$ as by means of the bearings $b'$, $b^2$, and has mounted thereupon the splined pinion $f^2$ which meshes with the hypoid ring gear $f^3$ of the differential for the live axle sections $b^3$. Thus, power is delivered by the transmission $x$ to the solid shaft section $g$ which carries the differential planet pinions $d^2$, at which point the power is divided between the gears $d^3$ and $d^4$, the gear $d^3$ being carried with the hollow shaft section $e$ which drives the differential ring gear $f'$ through the pinion $f$, and the gear $d^4$ being carried with the shaft section $d^5$ which, through the universals $d^6$, $d^8$, drives the hollow shaft section $e$, in the rearward axle, which, in turn, drives the ring gear $f^3$ through the pinion $f^2$.

Figure 2:
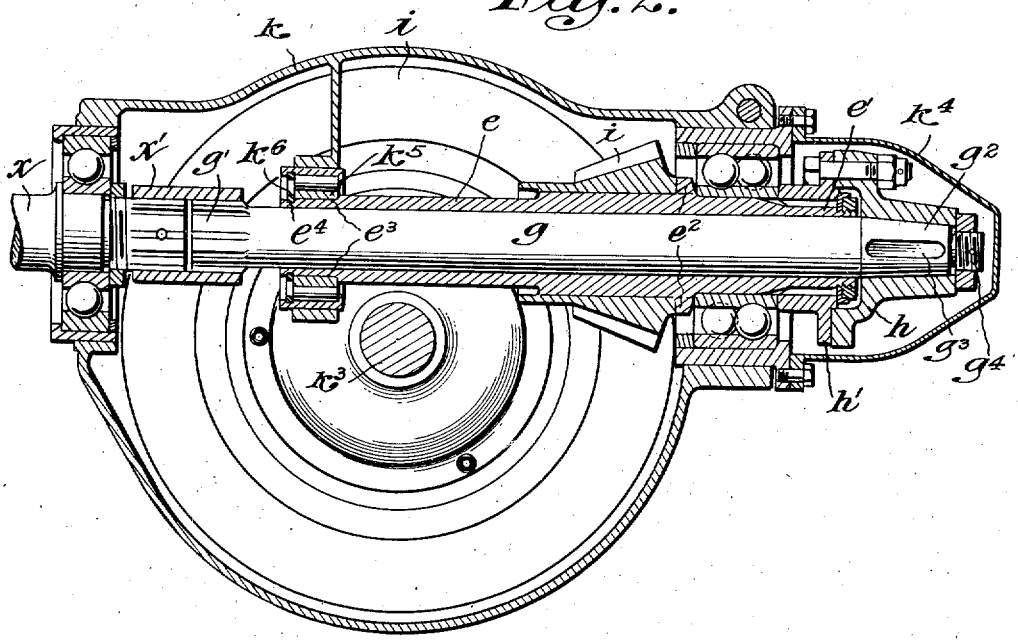
Figure 2 is a sectional view through an axle housing showing the invention as applied to a single rear axle drive.

The same parts may be used for a single rear axle drive, as shown in Figure 2. In the case of a single rear axle drive, however, the solid shaft section $g$, which is connected at its end $g'$ with the transmission shafting $x$ as by means of sleeve $x'$, is keyed at its end $g^3$ to a flanged hub $h$. The hub $h$ is bolted to the sleeve $h'$ which is carried with the flanged end $e'$ of the hollow shaft $e$. Thus, power is delivered by the transmission shafting $x$ to the solid shaft $g$ from whence it is transmitted directly to the hollow shaft $e$ through the hub $h$ and the sleeve $h'$. The ring gear $i'$ of the differential between the shaft sections $k^3$, is driven by the pinion $i$ which is mounted upon the hollow shaft $e$. A cap $k^4$ may be provided to retain lubricant within the housing $k$.

Reverting now again to the dual drive there is shown in Figure 6 the manner in which the differentials between the axle sections $a^3$, $a^3$, and $b^3$, $b^3$, are driven by the ring gears $f'$ and $f^3$. The ring gear $f'$, for instance, has mounted thereon the carrier $f^4$ for the planet pinions $f^5$ which mesh with the bevel gears $f^6$, $f^7$. The bevel gears $f^6$ are carried with the live axle sections $a^3$, $a^3$, and the power supplied to the ring gear is thus divided between the respective wheels. The power delivered to the ring gear $f^3$ is similarly divided between the live axle sections $b^3$, $b^3$ by a differential mounted with the ring gear $f^3$ in a similar manner.

In order to keep the direction of rotation of the two pairs of wheels in the dual axle drive the same the ring gears $f'$, $f^3$ are mounted upon opposite sides of the line of the transmission shafting and the relative positions of the hypoid pinions meshing therewith are reversed, that is, the pinion $f$ meshing with the ring gear $f'$ is to the rear of the live axle $a^3$ while the pinion $f^2$ meshing with the ring gear $f^3$ is forward of the live axle sections $b^3$. Of course, the relative positions of the housings $a$ and $b$ will also be reversed.

The details of design of the shaft members are apparent from the drawings. The hollow shaft member $e$ is formed with projections as at $e^2$, which serve to maintain the hypoid pinions in proper position, and is splined at its end $e^3$ to receive one race of a bearing as $k^5$ and is grooved as at $e^4$ to receive the retaining ring $k^6$ for the bearing. The other end $e'$ of the hollow shaft is splined and threaded to adapt it for connection with the sleeve $h'$, the differential gear $d^3$, or the universal joint $d^8$, as the case may be. The solid shaft $g$ is splined at its end $g'$ to adapt it for connection with the transmission shafting as by means of the sleeve $x'$ and its end $g^2$ is threaded as at $g^4$ and provided with a keyway $g^3$ to adapt it for connection with the hub $h$ or the differential planet pinion carrier $d'$, as the case may be.

There have thus been provided means whereby the same driving axle members may be used in interchangeably for either single or dual rear axle drives. The parts themselves are simple and easy of manufacture and the saving from the standpoint of production will be apparent, since the necessity for manufacturing parts of different design for single and dual drive axles, respectively, has been eliminated.

Various modifications in the design and arrangement of parts may be made without departing from the spirit or scope of the invention and nothing which has been said in the foregoing description is intended as a limitation except as indicated in the following claims.

What I claim is:

1. In a drive for a plurality of axles, a differential, a solid shaft for transmitting power to the differential, a hollow shaft, a housing for journaling the hollow shaft and one of the axles, a solid shaft journaled within the hollow shaft, driving connections between the hollow shaft and the differential and the last named axle, a hollow shaft similar in construction to the first hollow shaft, and interchangeable therewith, a housing journaling the last named hollow shaft and another of the axles, and driving connections between the last named hollow shaft and the differential and last named axle.

2. In a drive for a plurality of axles, a differential, a solid shaft for transmitting power to the differential, a hollow shaft, a housing for journaling the hollow shaft and one of the axles, a solid shaft journaled within the hollow shaft, means on one end of the hollow shaft to transmit power thereto, driving connections between the differential and the power transmitting means on the hollow shaft, and between the hollow shaft and last named axle, a hollow shaft similar in construction to the first hollow shaft, a housing for journaling the last named hollow shaft and interchangeable therewith and another of the axles with the end of the hollow shaft carrying the power transmitting means adjacent the corresponding means of the first hollow shaft, and driving connections between the differential and power transmitting means on the second hollow shaft, and between the second hollow shaft and the last named axle.

This specification signed this 3rd day of July, A. D. 1931.

ALFRED F. MASURY.